(12) United States Patent
Schurter et al.

(10) Patent No.: US 6,417,596 B1
(45) Date of Patent: Jul. 9, 2002

(54) APPARATUS AND METHOD FOR ATTACHING A SHAFT TO AN ELECTRIC MOTOR ROTOR

(75) Inventors: Robert M. Schurter, Colgate; Robert J. Heideman, Kewaskum; Vaughn A. DeVorse, New Berlin, all of WI (US)

(73) Assignee: A. O. Smith Corporation, Milwaukee, WI (US)

( * ) Notice: Subject to any disclaimer, the term of this patent is extended or adjusted under 35 U.S.C. 154(b) by 0 days.

(21) Appl. No.: 09/575,322

(22) Filed: May 19, 2000

(51) Int. Cl.[7] ................................................ H02K 1/22
(52) U.S. Cl. .......................................... 310/261; 29/598
(58) Field of Search ................................ 310/261, 216, 310/42, 156.79, 156.11; 29/598

(56) References Cited

U.S. PATENT DOCUMENTS

| | | | |
|---|---|---|---|
| 2,927,229 A | * 3/1960 | Merrill | 310/162 |
| 3,513,341 A | * 5/1970 | Gratzmuller | 310/156.69 |
| 3,599,024 A | * 8/1971 | Kitamura | 310/163 |
| 4,417,168 A | 11/1983 | Miller et al. | 310/56.52 |
| 4,562,641 A | * 1/1986 | Mosher et al. | 29/598 |
| 4,614,888 A | 9/1986 | Mosher et al. | 310/261 |
| 4,663,550 A | * 5/1987 | Kawada et al. | 310/93 |
| 4,741,094 A | * 5/1988 | Denk et al. | 29/598 |
| 5,053,666 A | 10/1991 | Kliman et al. | 310/261 |
| 5,191,256 A | 3/1993 | Reiter, Jr. et al. | 310/156.49 |
| 5,323,080 A | 6/1994 | Shahamat et al. | 310/261 |
| 5,325,009 A | 6/1994 | Capion et al. | 310/261 |

FOREIGN PATENT DOCUMENTS

| | | | |
|---|---|---|---|
| EP | 0337646 | * | 10/1989 |
| JP | 2001129677 | * | 5/2001 |

* cited by examiner

*Primary Examiner*—Joseph Waks
(74) *Attorney, Agent, or Firm*—Michael Best & Friedrich LLP

(57) ABSTRACT

A rotor in which shaft portions are welded directly to the ends of a rotor stack by friction welding, which eliminates the need for a shaft hole in the rotor stack, thus providing a rotor in which each lamination has an unstamped, solid center, and the rotor has no other bores therein. As a result, no scrap is generated and motor efficiency is improved because the rotor has no bores therein. In addition, the amount of shaft material needed is also reduced because the shaft does not extend through the rotor stack.

8 Claims, 1 Drawing Sheet

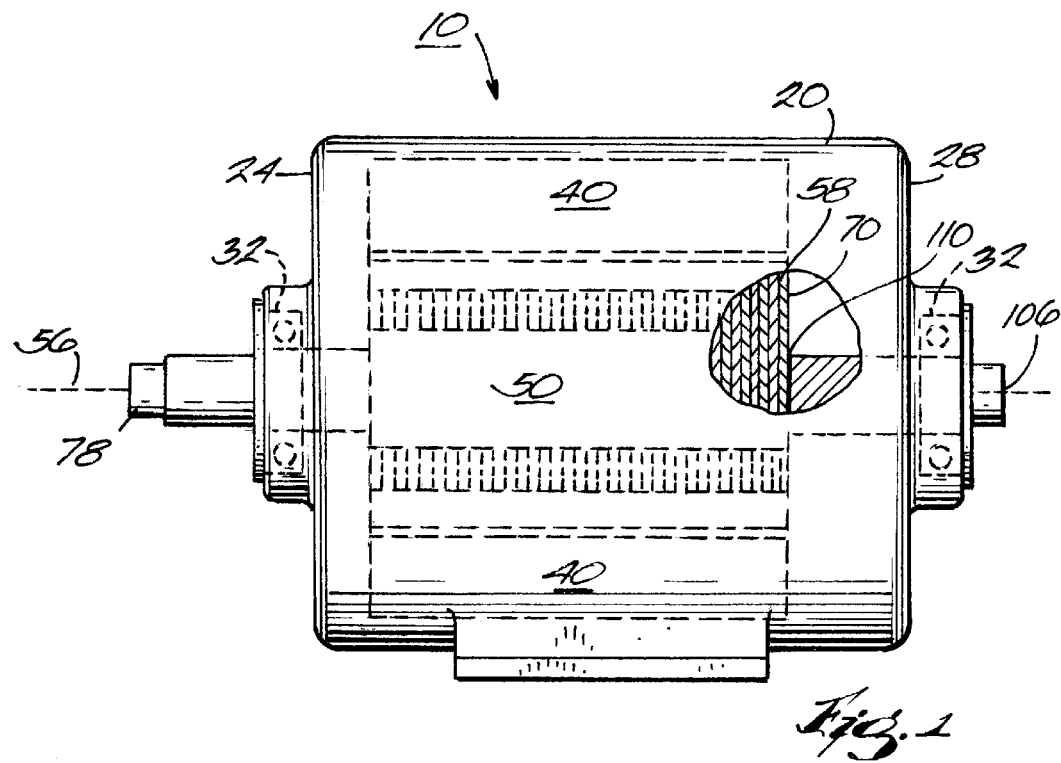
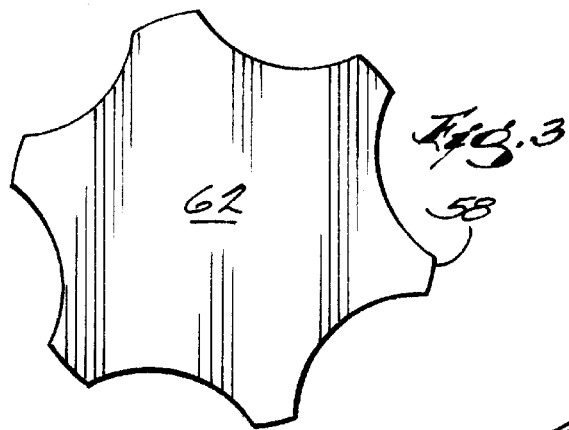
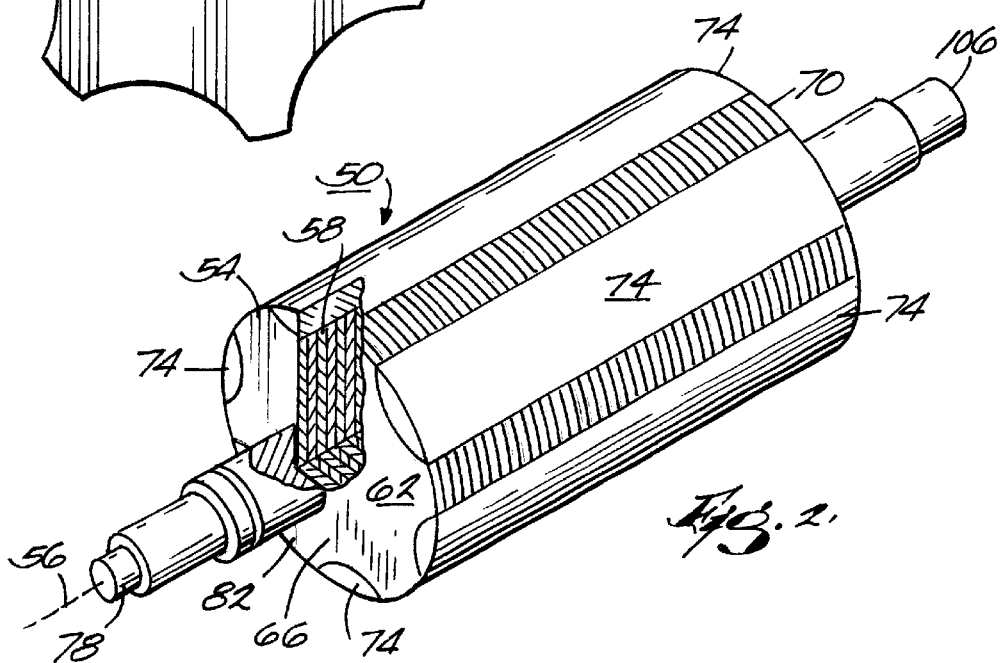

APPARATUS AND METHOD FOR ATTACHING A SHAFT TO AN ELECTRIC MOTOR ROTOR

FIELD OF THE INVENTION

The invention relates to rotors for electric motors and, specifically, to rotor shafts and how they are attached to such rotors.

BACKGROUND OF THE INVENTION

In prior art methods of attaching a rotor shaft to a rotor stack to build a rotor for an electric motor, a solid round rotor shaft is manufactured. Laminations are also manufactured, a hole is stamped through the center of each lamination, and the laminations are then attached to each other in a face-to-face orientation to create a rotor stack having a central bore formed by the holes in the laminations. The rotor shaft is inserted in the bore through the entire length of the rotor stack. Commonly, the rotor stack is heated and the shaft is cold when the shaft is inserted. When the parts cool, a pressure bond is formed between the rotor stack and the rotor shaft, thus yielding a rotor in which the rotor stack is mechanically attached to the rotor shaft.

SUMMARY OF THE INVENTION

Using such a prior art method of attaching a rotor shaft to a rotor stack, scrap is generated when each rotor lamination is stamped with a hole for the shaft. In addition, the shaft hole in the rotor stack creates magnetic losses that lower motor efficiency.

The invention provides a rotor in which shaft portions are welded directly to the ends of a rotor stack, preferably by friction welding.

The invention solves both the scrap and efficiency problems by eliminating the need for the shaft hole in the rotor, thus providing a rotor in which each lamination of the rotor stack has an unstamped, solid center, and the rotor stack preferably has therein no other bores. As a result, no scrap is generated and motor efficiency is improved. In addition, the amount of shaft material needed is also reduced because the shaft does not extend through the rotor stack.

Other features and advantages of the invention will become apparent to those skilled in the art upon review of the following detailed description, claims, and drawings.

BRIEF DESCRIPTION OF THE DRAWINGS

FIG. 1 is a partially cutaway elevation view of an electric motor embodying the invention.

FIG. 2 is a partially cutaway perspective view of the rotor of the electric motor illustrated in FIG. 1.

FIG. 3 is an elevation view of a single lamination for the rotor of the electric motor illustrated in FIG. 1.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENTS

An electric motor 10 embodying the invention is illustrated in FIG. 1. The specific motor embodiment shown is for exemplary purposes. The invention described herein may be used in any type of electric motor having a rotor supported by a shaft-like member.

As illustrated in FIG. 1, the motor 10 includes a motor housing 20 with first and second ends 24, 28. The motor housing 20 may include a plurality of housing pieces (not shown) to accommodate assembly and maintenance. Mounted within each end 24, 28 of the housing 20 is a respective bearing assembly 32. A stator 40 is mounted within the housing 20. A generally cylindrical motor rotor 50 is rotationally supported within the housing 20, in a manner described below, such that the rotor 50 may turn freely within the stator 40.

Referring to FIG. 2, the rotor 50 includes a core or rotor stack 54 with a longitudinal axis 56. In the preferred embodiment, the rotor stack comprises a plurality of substantially planar and generally circular laminations 58 in face-to-face alignment as best seen in the cutaway portion of FIG. 2. A solid or other suitable core may also be used. Each lamination 58 is preferably bonded to each adjacent lamination 58, but any other suitable method of attachment may be used. Each lamination 58 is substantially identical to the other laminations 58, each lamination 58 having a diameter substantially identical to the diameters of the other laminations 58, and each lamination 58 also having a thickness substantially identical to the thicknesses of the other laminations 58. Each lamination 58 also has a solid central region 62 centered on the longitudinal axis 56 of the rotor stack 54 (see FIG. 3). In other words, the laminations 58 do not have shaft holes. The rotor stack 54 includes first and second ends 66, 70 and preferably has therein no bores.

The rotor 50 also includes magnetically-permeable material 74 affixed to the rotor stack 54, as shown schematically in FIG. 2. The material may be magnets, windings, or any other suitable material.

The rotor 50 also includes a generally cylindrical first shaft portion 78 with a longitudinal axis colinear with the axis 56 of the rotor stack 54. The shaft portion 78 has a planar end surface that abuts the stack end 66. The shaft portion 78 is attached directly to the rotor stack 54 at the end 66, preferably by friction welding as indicated by reference number 82 in FIG. 2, but may be attached directly to the end 66 of the rotor stack 54 by any other suitable method. The shaft portion 78 is thus welded directly to the lamination 58 on the end 66 of the rotor stack 54.

The rotor 50 also includes a generally cylindrical second shaft portion 106 with a longitudinal axis colinear with the axis 56 of the rotor stack 54. The shaft portion 106 has a planar end surface that abuts the stack end 70. The shaft portion 106 is attached directly to the rotor stack 54 at the end 70, preferably by friction welding as indicated by reference number 110 in FIG. 1, but may be attached directly to the second end 70 of the rotor stack 54 by any other suitable method. The shaft portion 106 is thus welded directly to the lamination 58 on the end 70 of the rotor stack 54.

It is possible that the end welds 82, 110 could penetrate into more than the first or outermost lamination 58 on each end 66, 70 of the rotor stack 54, respectively, depending on the degree of heat transfer between laminations 58. This situation is foreseen and does not alter the invention or its advantages.

The end welds 82, 110 can be made either simultaneously in a dual-headed welder or consecutively in a standard welder depending on the production rates and tolerances required. The welder can be a standard friction welder, either direct-drive or inertial.

The invention solves both scrap and efficiency problems by eliminating the need for a shaft hole through the rotor, thus providing a rotor in which each lamination of the rotor stack has an unstamped, solid center, and the rotor stack preferably has no other bores therein. As a result, no scrap is generated and motor efficiency is improved. In addition, the amount of shaft material needed is also reduced because the shaft does not extend through the rotor stack.

Various features of the invention are set forth in the following claims.

What is claimed is:

1. A rotor assembly for an electric motor, the assembly comprising:

a rotor having a longitudinal axis and a first end; and a first shaft portion having a longitudinal axis colinear with the axis of the rotor, the first shaft portion being welded directly to the first end of the rotor;

wherein the rotor includes at least three generally circular laminations in face-to-face alignment, one of the laminations defining the first end of the rotor, the first shaft portion being welded directly to the one of the laminations defining the first end of the rotor.

2. The assembly of claim 1, each of the laminations being bonded to an adjacent lamination.

3. The assembly of claim 1, each of the laminations having a diameter substantially identical to the diameters of the other laminations, and each of the laminations also having a thickness substantially identical to the thicknesses of the other laminations.

4. The assembly of claim 1, wherein the first shaft portion is welded directly to the one of the laminations by a weld that penetrates more than the one of the laminations.

5. An electric motor comprising:

a housing;

a stator supported by the housing;

a rotor stack having a longitudinal axis and first and second ends and including a plurality of generally circular laminations in face-to-face alignment, one of the laminations defining the first end of the rotor stack and an other one of the laminations defining the second end of the rotor stack, each of the of laminations being bonded to an adjacent lamination, each of the laminations having a diameter substantially identical to the diameters of the other laminations, and each of the laminations also having a thickness substantially identical to the thicknesses of the other laminations, each of the laminations also having a solid central region centered on the axis;

a first shaft portion having a longitudinal axis colinear with the axis of the rotor stack, the first shaft portion being welded directly to the one of the laminations defining the first end of the rotor stack; and a second shaft portion having a longitudinal axis colinear with the axis of the rotor stack, the second shaft portion being welded directly to the other one of the laminations defining the second end of the rotor stack, the shaft portions being supported by the housing such that the rotor stack is rotatable relative to the stator.

6. The assembly of claim 5, the shaft portions being welded to the one of the laminations defining the first end of the rotor stack and the other one of the laminations defining the second end of the rotor stack by friction welding.

7. The assembly of claim 5, wherein the first shaft portion is welded directly to the one of the laminations by a first weld that penetrates more than the one of the laminations.

8. The assembly of claim 7, wherein the second shaft portion is welded directly to the other one of the laminations by a second weld that penetrates more than the other one of the laminations.

* * * * *